United States Patent [19]

Duckworth

[11] Patent Number: 5,667,180
[45] Date of Patent: Sep. 16, 1997

[54] ADAPTABLE VEHICLE ASHTRAY SHELF BRACKET

[76] Inventor: David Lewis Duckworth, 914 Edgewood St., Inglewood, Calif. 90302

[21] Appl. No.: 412,915

[22] Filed: Mar. 29, 1995

[51] Int. Cl.$^6$ ............................................. A47K 1/08
[52] U.S. Cl. .................... 248/311.2; 248/205.2; 108/45
[58] Field of Search .................. 248/311.2, 205.2, 248/310, 314; 224/483, 555, 545, 547, 558; 108/44, 45, 25, 26

[56] References Cited

U.S. PATENT DOCUMENTS

| | | | |
|---|---|---|---|
| 4,535,923 | 8/1985 | Manke | 224/273 |
| 4,793,394 | 12/1988 | Cohen | 248/311.2 |
| 4,951,910 | 8/1990 | March | 248/205.2 |
| 5,042,770 | 8/1991 | Louthan | 248/311 |
| 5,044,577 | 9/1991 | Spearman | 224/42 |
| 5,052,649 | 10/1991 | Hunnicutt | 248/311 |
| 5,199,678 | 4/1993 | Luebke | 248/311 |
| 5,249,770 | 10/1993 | Louthan | 248/311 |
| 5,337,677 | 8/1994 | Peeno | 108/45 |
| 5,474,272 | 12/1995 | Thompson et al. | 248/311.2 |
| 5,489,055 | 2/1996 | Levy | 248/311.2 |

*Primary Examiner*—Leslie A. Braun
*Assistant Examiner*—Willie Berry, Jr.
*Attorney, Agent, or Firm*—Gene Scott - Patent Law & Venture Group

[57] ABSTRACT

A shelf bracket designed to adapt a standard vehicle ashtray into an open receptacle for retaining items, such as beverage containers, in a way that resists both horizontal and vertical motion. The shelf bracket consists of a planar shelf positioned horizontally over the ashtray and is secured in position by an ashtray straddling means that consists of at least one pair of downwardly extending rigid tabs positioned on each side of the shelf. The distance between the tabs of each individual pair is slightly less than the thickness of an ashtray wall and the distance between the two opposing tab pairs is approximately equal to the width of the vehicle ashtray, thus allowing each of the ashtray side walls to be inserted between a pair of tabs which clamp firmly against the side wall. A strap securing means is provided to restrain vertical movement of the shelf by tightly securing the straddling means around a bottom of the vehicle ashtray, and a receptacle means is rigidly secured to the top surface of the shelf for retaining items. Additionally, a cylindrical holder means can be inserted into the receptacle means, the holder means designed to accept and retain a beverage container motionless therein.

13 Claims, 2 Drawing Sheets

ADAPTABLE VEHICLE ASHTRAY SHELF BRACKET

BACKGROUND OF THE INVENTION

1. Field of the Invention

This invention relates generally to beverage holders and more particularly to an improved beverage holder designed to adapt a standard vehicle ashtray into an open receptacle for retaining items such as beverage containers, keys and the like in such a way as to resist both vertical and horizontal motion, thus preventing items from easily spilling or falling due to vehicle motion.

2. Description of Related Art

Invention and use of beverage holders is known to the public, as they are frequently used to hold and secure a beverage container in a location which is easily and conveniently accessible to the user. Since many standard beverage holding devices, such as that disclosed in Luebke U.S. Pat. No. 5,199,678, cannot be feasibly utilized to hold a beverage container in a moving vehicle, there are several available beverage holding devices designed specifically to secure a beverage container in a vehicle.

For example, Louthan U.S. Pat. No. 5,249,770 discloses a beverage holder with integral straps that allow the holder to be secured around various objects for holding it in place. Manke U.S. Pat. No. 4,535,923 discloses an automobile beverage holder that is intended to be clipped onto a fully opened ashtray or a glove compartment door. However, this device, as with that of Louthan, hangs unsupported from the side wall of the ashtray or glove compartment, thus making it very susceptible to horizontal movement of the vehicle. In addition, these devices are easily upset by the occupants of the vehicle, as they hang in high-traffic areas, such as near the radio or in the space normally occupied by the passenger's legs.

Hunnicutt U.S. Pat. No. 5,052,649 presents a more stable, secure drink holder which consists of a cylindrical portion that holds an insulated beverage holder which in turn holds a beverage. However, the nature of the device is such that it can only be used with a pre-existing beverage receptacle in a vehicle consul or armchair to further stabilize the beverage container and retain its temperature, and is thus useless in vehicles without an integral beverage receptacle unit.

Spearman U.S. Pat. No. 5,044,577 discloses a beverage holding device capable of containing two beverages. It is a significant improvement over the other prior art in that it is firmly mounted into the opening of a glove compartment or ashtray, thus providing a higher degree of stability than those that hang from an object. However, Spearman's device is also subject to several problems. First of all, it has a substantially larger size than other beverage holding devices, which is a significant disadvantage in the close confines of a vehicle interior.

Most importantly, however, Spearman, as with the rest of the above mentioned prior art, cannot resist both vertical and horizontal motion, and is therefore unstable and prone to spilling the beverage over bumps, turns, braking and other unpredictable movements of the vehicle or its occupants. Thus, there is a clear need for an improved beverage holder which effectively resists both vertical and horizontal movement. Such a holder would be relatively compact, and would be secured in such a way as to not restrict movement of the passengers. The present invention fulfills these needs and provides further related advantages as described in the following summary.

SUMMARY OF THE INVENTION

The present invention is a shelf bracket that is designed to adapt a standard vehicle ashtray into an open receptacle in which keys, makeup, drinks, food and the like can be stored. The shelf bracket improves significantly over prior art holding devices in that it is able to resist both vertical and horizontal motion, thus preventing items from falling or spilling when the vehicle is in motion.

The invention consists of a planar shelf that rests horizontally across an opening of the vehicle ashtray. The shelf is secured on top of the ashtray with an astray straddling means in such a way as to prohibit horizontal movement. The ashtray straddling means is composed of two pairs of tabs, a single pair positioned on each side of the shelf. The tabs extend perpendicularly downward from a bottom surface of the shelf, and the space between the tabs in each pair is slightly less than the width of the ashtray's side walls. Thus, to secure the shelf to the ashtray, each of the ashtray side walls is simply inserted between the corresponding pair of extended tabs so that the tabs act as clamps against the side walls of the ashtray. In another embodiment, one side of the straddling means may include a series of downwardly extending tabs instead of merely one pair. The additional tabs would enable the shelf to be mounted onto a variety of different width vehicle ashtrays. Thus, it is an object of the invention to allow a single shelf bracket device to be used interchangeably between different types of vehicles.

To prevent the shelf from moving vertically, the shelf and straddling means are secured around the ashtray with a securing strap means. The securing strap is long enough to extend from the outermost tab on one side of the straddling means, under the ashtray to the outermost tab on the other side of the straddling means. Preferably, the securing strap attaches to the straddling means with a two part hook and loop type-fastener such as VELCRO. In this embodiment, one fastening strip is positioned on the outermost tab on each side of the straddling means, and corresponding fastening strips are positioned on each end of the strap. Thus, it is an object of the present invention to allow the entire shelf bracket to be easily and conveniently removed from the ashtray as desired by simply unfastening the securing strap from the straddling means and removing the tabs of the straddling means from around the ashtray side walls.

A receptacle means is permanently mounted on the upfacing surface of the shelf. The receptacle means is preferably a shallow tray with a circular, vertical peripheral wall that allows the receptacle means to receive and retain a variety of different items such as keys, change, make-up and the like.

When it is desired to retain larger items, such as beverage containers, motionlessly within the receptacle means, a holder means is simply secured within the shallow tray. The holder means is essentially a rigid, hollow cylinder that is of a size and shape so as to be easily inserted into the shallow tray with a tight friction fit. The cylindrical holder means has a height and diameter that corresponds generally with a beverage container, and a vertical slot is positioned in the cylinder so as to allow handled beverage containers to be held within it. To insulate the beverage container and ensure a firm fit between the beverage container and the holder means, a thin, foam container restricting means can be inserted into the holder means. Thus, it is an object of the invention to improve over prior art device, as the present invention can easily be adapted to retain large items, such as beverage containers, or smaller items, such as keys and change, simply by removing or inserting the holder means into the shallow tray of the receptacle means.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the invention. In such drawings.

DETAILED DESCRIPTION OF THE PREFERRED EMBODIMENT

Figure 1:
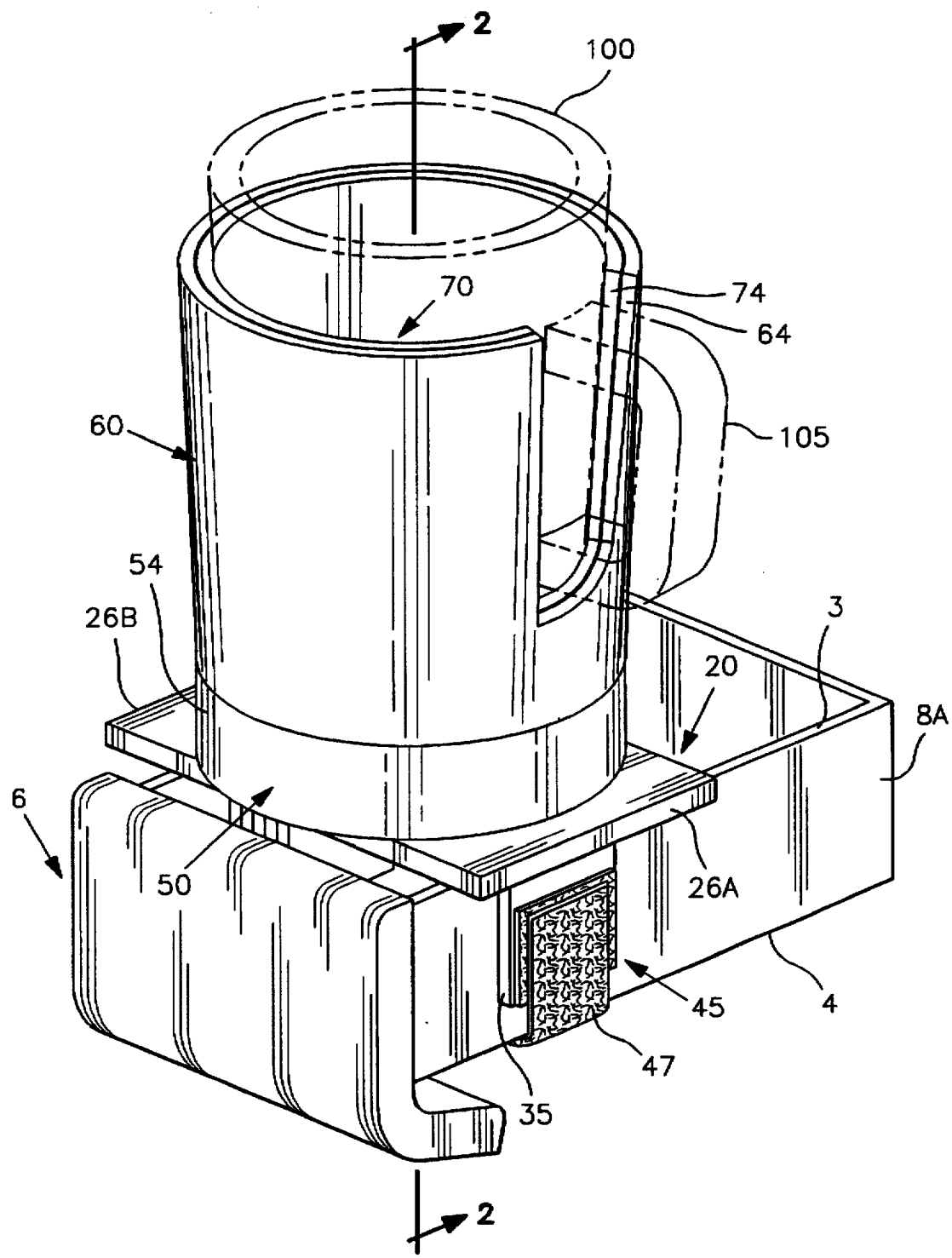
FIG. 1 is a perspective view of the preferred embodiment of the present invention, particularly showing the relationship between the invention and an ashtray of a vehicle.
Figure 2:
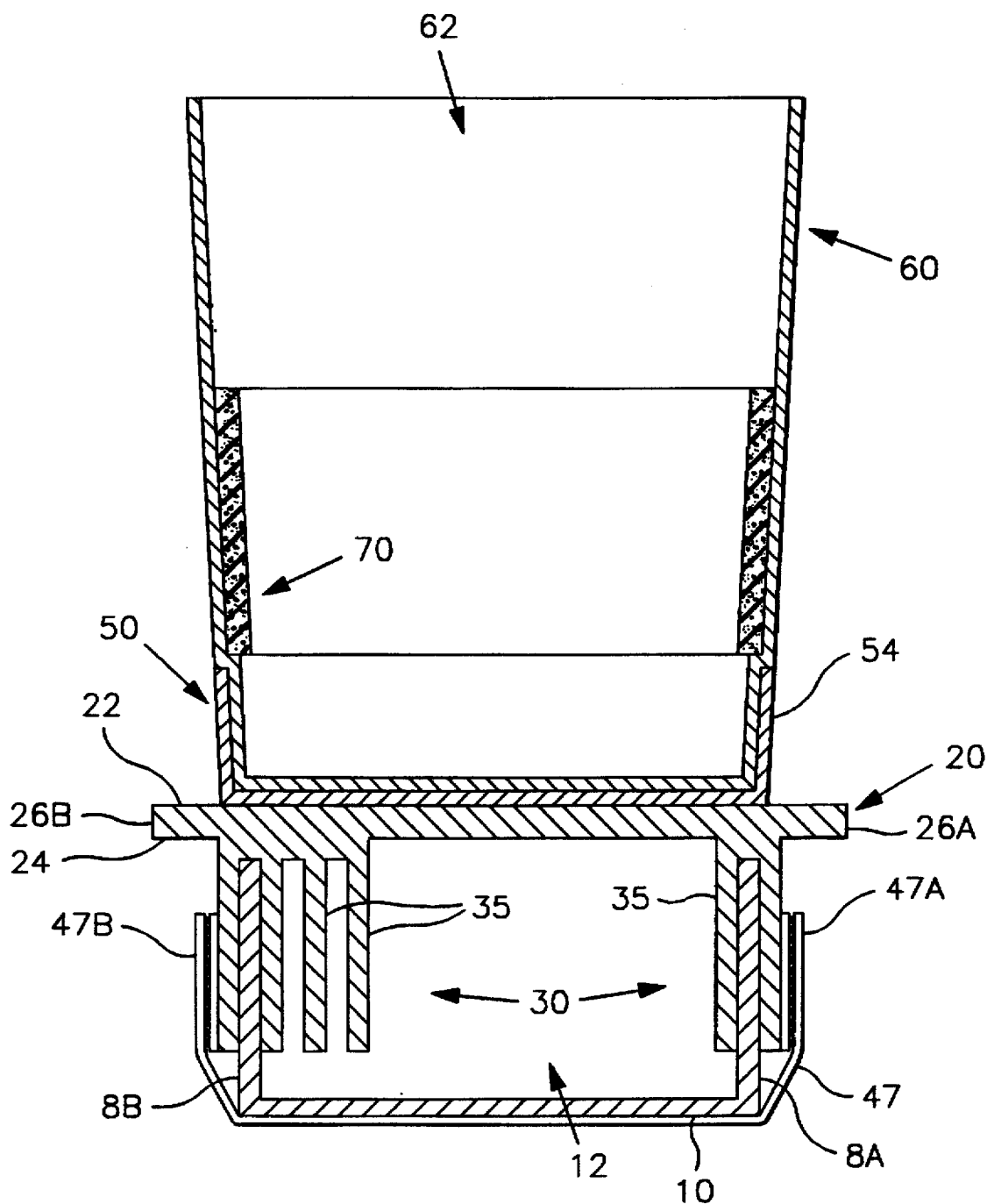
FIG. 2 is a cross-sectional view taken along lines 2—2 of FIG. 1 showing further internal details of the invention.

FIGS. 1 and 2 show a preferred mode of the present inventive shelf bracket that adapts a standard vehicle ashtray 6 into an open receptacle in which keys, makeup, drinks, food and the like can be stored. The shelf bracket is constructed so as to resist both vertical and horizontal motion of the vehicle, thus preventing items from falling or spilling when the vehicle is in motion.

Standard vehicle ashtrays 6 generally have two opposing vertical side walls 8A and 8B, each with an upfacing edge 3 and a downfacing edge 4. A horizontal bottom wall 10 extends between the downfacing edges 4 of the two side walls 8A and 8B so as to form an upfacing open area 12 in which ashes or trash are typically deposited.

The present inventive adaptable vehicle ashtray shelf bracket consists generally of a planar shelf 20, an ashtray straddling means 30, a securing strap means 45 and a receptacle means 50. As illustrated in FIGS. 1 and 2, the planar shelf 20 is designed to fit horizontally over the ashtray open area 12, resting on the upfacing edge 3 of the ashtray's side walls 8A and 8B. The shelf 20 is of rigid construction and has flat top 22 and bottom 24 surfaces. It preferably has a rectangular shape, but may be shaped otherwise, and provides opposing ends 26A and 26B. The shelf 20 is preferably slightly wider than the largest of standard vehicle ashtrays 6 so that the shelf 20 is capable of covering the ashtray open area 12 of numerous different sized vehicle ashtrays 6.

The shelf 20 is secured to the ashtray 6 and restrained from horizontal movement by the ashtray straddling means 30. The ashtray straddling means 30 consists generally of parallel, stiff tabs 35 that extend perpendicularly downward from the bottom surface 24 of the shelf 20. In one embodiment, the straddling means 30 consists of one pair of tabs 35 positioned near one of the opposing ends 26A, and another pair of stiff tabs 35 positioned near the other one of the opposing ends 26B. The distance between the tabs 35 of each individual pair is slightly less than the thickness of the ashtray walls 8A and 8B, and the tab pairs are positioned so as to engage the walls 8A and 8B respectively. Thus, to secure the shelf 20 on top of the ashtray 6, the one of the ashtray's side walls 8A is inserted between one pair of tabs 35, and the other ashtray side wall 8B is inserted between the other tab pair of tabs 35 so that the side walls 8A and 8B are each sandwiched between two tabs 35, thus securely holding the shelf 20 in place.

However, because of the limited number of tabs 35 in this embodiment, the straddling means 30 can only straddle a single sized ashtray 6. Therefore it is preferable, as illustrated in FIG. 2, to have multiple tabs 35 arranged to accommodate ashtrays 6 of differing widths.

The adjustable securing strap means 45 is provided to restrain vertical movement of the shelf 20. The securing strap means 45 is a flexible strap 47 having two ends 47A and 47B, and a length great enough so that the strap 47 extends from one of the tabs 35 which is situated nearest one of the opposing ends 26A, and from thence under the ashtray 6 and to another one of the tabs 35 which is situated nearest the other of the opposing ends 26B, as illustrated in FIG. 2. The securing strap 47 attaches to the straddling means 30 with a mating two-part fastener means, preferably a hook and loop type-fastener such as VELCRO. In this embodiment, as illustrated in FIG. 2, one fastening strip is positioned on the tab 35 nearest one of the opposing ends 26A, and a corresponding fastening strip is positioned on one fastening strap end 47A. The other end of the fastening strip 47B is likewise secured to the tab 35 situated nearest the other opposing end 26B of the straddling means 30.

A receptacle means 50 is rigidly secured to the top surface 22 of the horizontal shelf 20. Preferably, the receptacle means 50 is a shallow tray with a circular, vertical peripheral wall 54 that is capable of receiving and retaining numerous, relatively small items such as change, candy or make-up.

A holder means 60 is provided so as to adapt the receptacle means 50 to effectively restraining specific items, such as a beverage container 100, motionless. The holder means 60 is preferably a hollow, rigid, cylinder that has a diameter equal to the inside diameter of the circular vertical wall 54 of the shallow tray. Thus, the holder means 60 can easily be removed or inserted into the receptacle means 50 according to the particular needs of the user. A top end 62 of the holder means 60 is open so that it can receive and retain a beverage container 100 or other such items. A vertical slot 64 extends through the top end 62 of the cylindrical holder means 60, so that the holder means 60 is capable of receiving a beverage container 100 with a handle 105, the handle 105 simply protruding out of the holder means 60 through the vertical slot 64.

Additionally, a container restricting means 70 is positioned inside the holder means 60 so as to hold a container motionless. The container restricting means 70 comprises an interior cylinder that fits tightly within the holder means 60. The container restricting means 70 may be constructed with the a height less than that of the holder means (FIG. 2), or it may be constructed with the same height as the holder means 60. In the later embodiment, as illustrated in FIG. 1, the restricting means 70 includes a vertical slot 74 that corresponds to the vertical slot 64 in the holder means 60. The container restricting means 70 is constructed of rubberized low friction material and is capable of insulating a drink container placed within the interior cylinder as well as acting resiliently to adapt itself to small variations in beverage container diameters.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A combination comprising:
   a vehicle ashtray;
   a rigid shelf having opposing surfaces, the shelf covering at least a portion of an opening in the vehicle ashtray with one of the opposing surfaces in contact therewith;
   ashtray straddling means integral with the shelf, engaging opposing side walls of the vehicle ashtray, securing the shelf thereto;

a securing strap means extending around at least a portion of the ashtray, the ashtray being encircled by the shelf and the strap means;

a receptacle means, the receptacle means being fixed to the other of the opposing surfaces, and oriented to receive and retain items therein;

wherein the ashtray straddling means comprises, on each of the two opposing sides of the planar shelf, at least one pair of parallel stiff tabs, wherein the stiff tabs are capable of straddling opposing side walls in the vehicle ashtray with a secure tension fit.

2. The adaptable vehicle ashtray shelf bracket of claim 1 wherein the ashtray straddling means comprises, at one side of the planar shelf, a pair of planar parallel stiff tabs, and at an opposite side of the planar shelf, a series of planar parallel stiff tabs, forming a sequence of pairs of tabs, wherein the distance between the single pair of tabs and each pair of tabs of the sequence is equal to one of a number of standard widths of vehicle ashtrays, so that the stiff tabs are capable of straddling any pair of side walls in vehicle ashtrays to secure the horizontal shelf on top of any vehicle ashtray.

3. The adaptable vehicle ashtray shelf bracket of claim 2 wherein each pair of tabs is separated by a distance slightly less than the thickness of a wall of the ashtray and the paired tabs act as clamps on the side walls of the ashtray.

4. The adaptable vehicle ashtray shelf bracket of claim 2 wherein the adjustable securing strap means comprises a flexible strap having two ends, wherein the two ends are attached to the two outermost of the tabs.

5. The adaptable vehicle ashtray shelf bracket of claim 4 further comprising at each of the two ends of the flexible strap and on each of the two outermost of the tabs mating two-part fastener means.

6. The adaptable vehicle ashtray shelf bracket of claim 5 wherein the mating two-part fastener means comprise mating hook and loop surface fastener material.

7. The adaptable vehicle ashtray shelf bracket of claim 2 wherein the receptacle means comprises a shallow tray having a circular vertical peripheral wall capable of receiving and retaining numerous items including change, drink containers, sunglasses, make-up, cellular phone, note pad, and other items.

8. The adaptable vehicle ashtray shelf bracket of claim 7 further comprising a holder means adapted to restrain a specific item motionless, wherein the holder means is provided with a circular base which is capable of being removably secured inside the circular vertical peripheral wall of the receptacle means with a tight friction fit.

9. The adaptable vehicle ashtray shelf bracket of claim 8 wherein the holder means comprises a drink container holder means removably insertable in the shallow tray with a tight friction fit inside the circular vertical peripheral wall of the shallow tray, wherein the drink container holder means comprises a hollow rigid cylinder equal in diameter to the inside diameter of the circular vertical wall of the shallow tray and having an open top, which cylinder is capable of receiving and retaining a drink container.

10. The adaptable vehicle ashtray shelf bracket of claim 9 wherein the drink container cylinder further comprises a slot vertically through the cylinder, wherein the cylinder is capable of receiving a drink container having a handle with the handle protruding out through the slot.

11. The adaptable vehicle ashtray shelf bracket of claim 10 wherein the drink container cylinder further comprises a container restricting means capable of holding a container motionless inside the drink container cylinder.

12. The adaptable vehicle ashtray shelf bracket of claim 11 wherein the container restricting means comprises an interior cylinder of rubberized low friction material fitting tightly within the drink container cylinder.

13. The adaptable vehicle ashtray shelf bracket of claim 12 wherein the interior cylinder extends the full height of the drink container cylinder and the interior cylinder is capable of insulating a drink container placed within the interior cylinder.

* * * * *